(12) United States Patent
Yamashita

(10) Patent No.: US 8,974,168 B2
(45) Date of Patent: Mar. 10, 2015

(54) MULTI-TIER AUTOMATIC WAREHOUSE

(75) Inventor: Shin Yamashita, Obertshausen (DE)

(73) Assignee: Dematic Systems GmbH, Heusenstamm (DE)

( * ) Notice: Subject to any disclaimer, the term of this patent is extended or adjusted under 35 U.S.C. 154(b) by 87 days.

(21) Appl. No.: 13/581,848

(22) PCT Filed: Mar. 3, 2011

(86) PCT No.: PCT/JP2011/054897
§ 371 (c)(1),
(2), (4) Date: Aug. 30, 2012

(87) PCT Pub. No.: WO2011/108636
PCT Pub. Date: Sep. 9, 2011

(65) Prior Publication Data
US 2012/0328397 A1 Dec. 27, 2012

(30) Foreign Application Priority Data
Mar. 3, 2010 (JP) .................................. 2010-047054

(51) Int. Cl.
*B65G 1/04* (2006.01)
*B65G 1/06* (2006.01)

(52) U.S. Cl.
CPC . *B65G 1/04* (2013.01); *B65G 1/065* (2013.01)
USPC ............ 414/279; 414/277; 414/278; 414/285

(58) Field of Classification Search
USPC .................. 414/277, 278, 279, 281, 285, 284
See application file for complete search history.

(56) References Cited

U.S. PATENT DOCUMENTS

| | | | | |
|---|---|---|---|---|
| 5,286,157 A | * | 2/1994 | Vainio et al. | 414/273 |
| 6,824,345 B2 | * | 11/2004 | Hansl et al. | 414/282 |
| 8,146,729 B1 | * | 4/2012 | Wagner et al. | 198/369.6 |
| 2004/0131451 A1 | * | 7/2004 | Winkler | 414/278 |

(Continued)

FOREIGN PATENT DOCUMENTS

| | | |
|---|---|---|
| EP | 2327643 A1 | 6/2011 |
| EP | 1964792 B1 | 4/2012 |

(Continued)

OTHER PUBLICATIONS

International Search Report of the International Searching Authority from corresponding Patent Cooperation Treaty (PCT) Application No. PCT/JP2011/054897, mailed May 17, 2011.

(Continued)

*Primary Examiner* — Kaitlin Joerger
(74) *Attorney, Agent, or Firm* — Gardner, Linn, Burkhart & Flory, LLP

(57) ABSTRACT

An automated storage/retrieval system has two pairs of multi-tier racks that are arranged in series. An elevator is disposed between the two pairs of multi-tier racks. The elevator enables a load to be delivered to and received from the two pairs of multi-tier racks. The automated storage/retrieval system having such a tandem structure not only can provide the same storage capacity as that of a conventional configuration in which two pairs of multi-tier racks are arranged in parallel, but also can be applied to a building with a limited height since the system does not need to have an extended height. Since only one elevator is needed, the number of units is less than that of a conventional system, reducing manufacturing cost and an installation space for the system.

14 Claims, 9 Drawing Sheets

(56) References Cited

U.S. PATENT DOCUMENTS

| | | |
|---|---|---|
| 2011/0008137 A1 | 1/2011 | Yamashita |
| 2012/0177465 A1* | 7/2012 | Koholka ............... 414/279 |

FOREIGN PATENT DOCUMENTS

| | | | | |
|---|---|---|---|---|
| JP | 08175620 A | | 7/1996 | |
| JP | 2002-114324 A | | 4/2002 | |
| JP | 2002114324 A | * | 4/2002 | ............ B65G 1/06 |
| JP | 2004123240 A | * | 4/2004 | ............ B65G 1/04 |
| WO | 2010-026633 A1 | | 3/2010 | |
| WO | WO 2010026633 | * | 3/2010 | ............ B65G 1/04 |

OTHER PUBLICATIONS

International Written Opinion of the International Searching Authority from corresponding Patent Cooperation Treaty (PCT) Application No. PCT/JP2011/054897.

English Translation of International Preliminary Report on Patentability from corresponding Patent Cooperation Treaty Patent Application No. PCT/JP2011/054897 dated Oct. 2, 2012.

Commonly assigned co-pending U.S. Appl. No. 14/244,362, filed on Apr. 3, 2014.

* cited by examiner

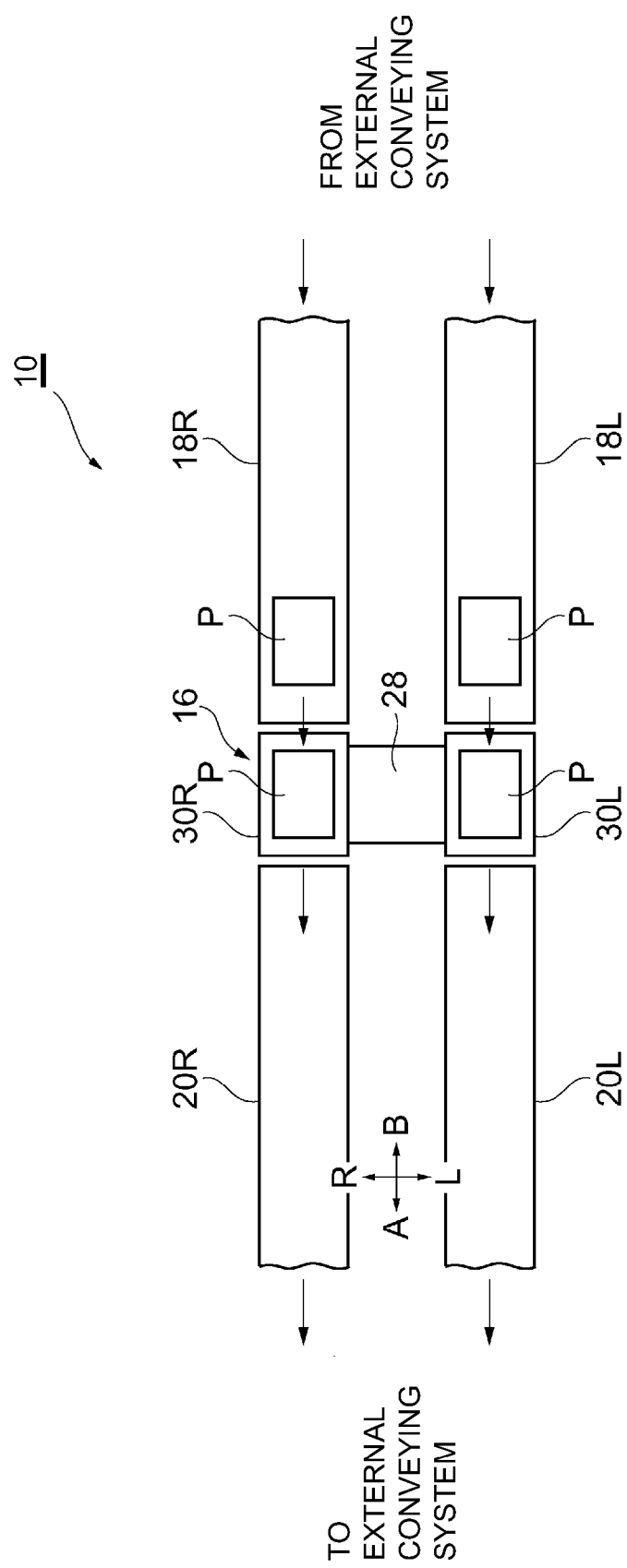

MULTI-TIER AUTOMATIC WAREHOUSE

CROSS REFERENCE TO RELATED APPLICATION

The present application claims the priority benefits of International Patent Application No. PCT/JP2011/054897, filed on Mar. 3, 2011, which is hereby incorporated herein by reference in its entirety.

BACKGROUND OF THE INVENTION

The present invention relates to an automated storage/retrieval system, more specifically to an automated storage/retrieval system having at least two pairs of multi-tier racks.

Japanese Examined Patent Application Publication No. HEI5-21802 discloses an example of a conventional automated storage/retrieval system. This automated storage/retrieval system 1 includes at least one pair of left and right multi-tier racks 3L, 3R, each having multi-tier shelves 2. At each tier between the multi-tier racks 3L, 3R is provided a transferring shuttle 4 that can run in a horizontal direction. Moving a load P upward and downward is performed by an elevator 6 that is disposed at one end of the multi-tier racks 3L, 3R and has two elevating platforms 5L, 5R. Further, delivering a load P to and receiving a load P from the elevating platforms 5R, 5L of the elevator 6 is performed by one storage conveyor 7 and one retrieval conveyor 8.

In such an automated storage/retrieval system 1 having a conventional configuration, in order to improve throughput performance and storage capacity, pairs (only two pairs are illustrated in FIG. 9) of the multi-tier racks 3L, 3R may be arranged right and left, and accordingly the number of the elevator 6, storage conveyor 7 and retrieval conveyor 8 may be added, as illustrated in FIG. 9.

However, to arrange the multi-tier racks 3L, 3R in parallel, the number of equipment composing the automated storage/retrieval system 1 is simply scaled, increasing a facility cost and requiring an excess space for installing the automated storage/retrieval system 1.

The number of tiers of the multi-tier racks 3L, 3R may be increased in order to increase storage capacity, but if a building for a system has a height limit, the number of tiers cannot be simply increased. In addition, the increase of the number of tiers of the multi-tier racks 3L, 3R increases storage capacity, but extends the lifting stroke of elevator 6, which in turn takes more time for elevator movement, thus decreasing throughput performance.

SUMMARY OF THE INVENTION

The present invention provides an automated storage/retrieval system that has a large storage capacity, but can reduce facility cost and installation space. Moreover, a high-throughput performance automated storage/retrieval system is provided.

An automated storage/retrieval system according to an aspect of the present invention includes a first pair of multi-tier racks, each having multi-tier shelves (22), that are arranged in parallel to each other and a first pair of waiting stations disposed adjacent to one end of the first pair of multi-tier racks, the first pair of waiting stations having the same tier number of waiting conveyors (26L, 26R) as the tier number of the shelves. A first transferring shuttle is disposed at each tier or a plurality of tiers of the shelves and waiting conveyors to be able to horizontally run between the first pair of multi-tier racks and between the first pair of waiting stations, the first transferring shuttle for delivering a load P to the shelves and waiting conveyors and receiving a load P from the shelves and waiting conveyors. A second pair of multi-tier racks, each have multi-tier shelves, that are arranged in parallel to each other. The second pair of multi-tier racks are arranged in series with the first pair of multi-tier racks so that the first pair of waiting stations are disposed between the second pair of multi-tier racks and the first pair of multi-tier racks. A second pair of waiting stations are disposed adjacent to one end of the second pair of multi-tier racks to face the first pair of waiting stations, the second pair of waiting stations having the same tier number of waiting conveyors as that of the shelves of the second pair of multi-tier racks. A second transferring shuttle is disposed at each tier or a plurality of tiers of the shelves of the second pair of multi-tier racks and the waiting conveyors of the second pair of waiting stations to be able to horizontally run between the second pair of multi-tier racks and between the second pair of waiting stations. The second transferring shuttle is for delivering a load to and receiving a load from the shelves of the second pair of multi-tier racks and the waiting conveyors of the second pair of waiting stations. An elevator disposed between the first pair of waiting stations and the second pair of waiting stations. The elevator includes a first elevating platform for delivering a load to and receives a load from the waiting conveyors at one of the first pair of waiting stations and one of the second pair of waiting stations, and a second elevating platform for delivering a load to and receives a load from the waiting conveyors at the other of the first pair of waiting stations and the other of the second pair of waiting stations. A first conveyor delivers a load to and receives a load from the first elevating platform. A second conveyor delivers a load to and receives a load from the second elevating platform.

An automated storage/retrieval system, according to another aspect of the invention includes two pairs of multi-tier racks that are arranged in series, not in parallel, and an elevator is disposed between the two pairs of multi-tier racks. The only elevator allows for storage to and retrieval from the two pairs of multi-tier racks.

The automated storage/retrieval system having such a tandem structure can secure the same storage capacity as that of a conventional configuration in which two pairs of multi-tier racks are arranged in parallel, and since the system does not need to be extended in elevation, the system can be applied to a building with a height limit. Since only one elevator is required for each two pairs of racks, the number of elevators is less than that of the conventional configuration, allowing for inexpensive manufacture and smaller installation space of an automated storage/retrieval system.

In addition, the automated storage/retrieval system may include a waiting conveyor at each tier of the first pair of waiting stations that is in alignment with the waiting conveyor at each tier of the second pair of waiting stations. Therefore, when the first elevating platform and second elevating platform are disposed between the waiting conveyors that face each other, the first and second elevating platforms and waiting conveyors preferably form a continuous conveying plane.

One waiting station of the first pair of waiting stations may be for storage, and one waiting station of the second pair of waiting stations that are on the same side of the waiting station is for retrieval. Transfer of a load from the first elevating platform to the waiting station and transfer of a load from the waiting station to the first elevating platform can be simultaneously performed, achieving higher efficiency and throughput performance. The other waiting station of the first pair of waiting stations may be for retrieval and the other waiting station of the second pair of waiting stations that are on the same side of the other waiting station is for storage. Such a configuration provides a fixed flow of a load, allowing for a simple layout and also retrieval in particular order.

A third conveyor may be provided to deliver a load and receive a load from the first elevating platform and a fourth conveyor may be provided to deliver a load and receive a load from the second elevating platform. The first and second conveyors may be for storage, and the third and fourth conveyors for retrieval, with the first conveyor, first elevating platform and third conveyor forming a continuous conveying plane and having the second conveyor, second elevating platform and fourth conveyor forming a continuous conveying plane. This allows for simultaneous transfer of loads between the storage conveyors and the elevating platform and a load between the elevating platform and the retrieval conveyors, achieving higher efficiency and throughput performance.

As described above, the automated storage/retrieval system, according to embodiments of the present invention, has the same storage capacity as that of conventional configuration, and also has a higher throughput performance, less facility cost and less installation space.

BRIEF DESCRIPTION OF THE DRAWINGS

FIG. 4 is a schematic cross-section view taken on line IV-IV of FIG. 1, which includes an elevating platform.

DESCRIPTION OF THE PREFERRED EMBODIMENT

Figure 1:
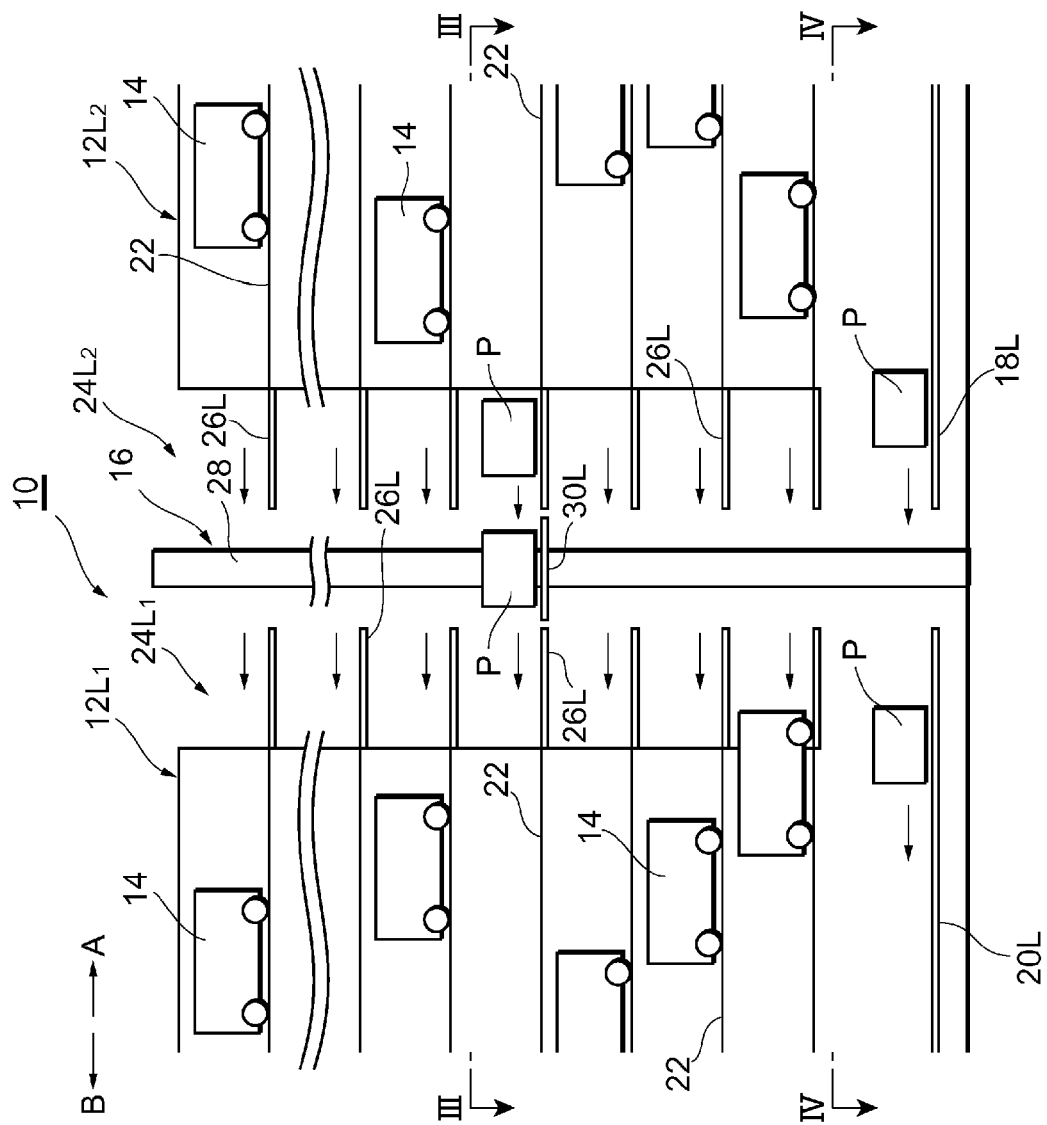
FIG. 1 is a schematic side view illustrating one side (left side) of an automated storage/retrieval system according to one embodiment of the present invention.
Figure 2:
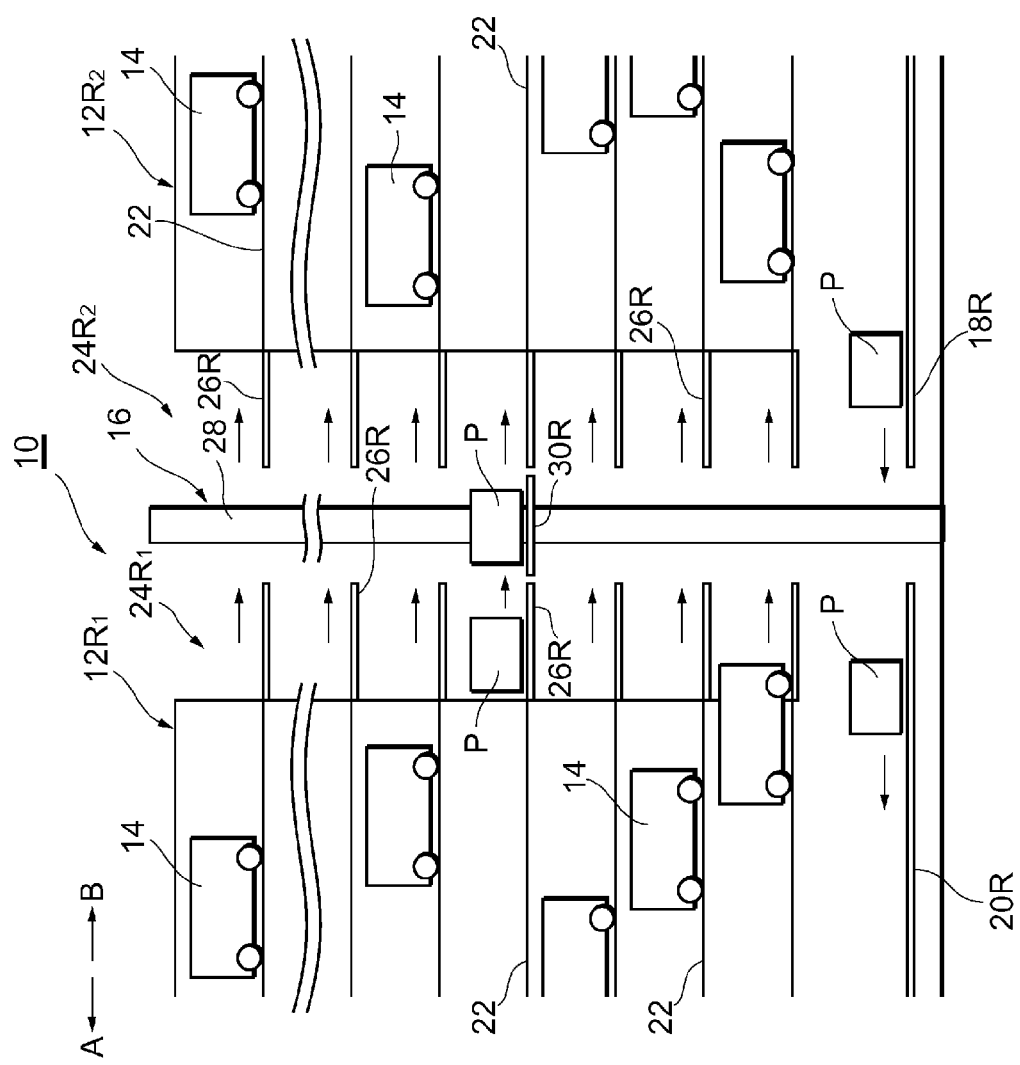
FIG. 2 is a schematic side view illustrating the other side (right side) of the automated storage/retrieval system illustrated in FIG. 1.

Now, preferred embodiments of the present invention will be described in detail with reference to the drawings. In the drawings, identical or corresponding sections have the same reference numbers, and the overlapping description will be omitted. For clarification, a suffix is attached to the reference number, as needed.

An automated storage/retrieval system 10 includes a multi-tier rack 12, transferring shuttle 14, elevator 16, storage conveyor 18 and retrieval conveyor 20 that are basically the same as a conventional system.

Automated storage/retrieval system 10 is a minimum basic unit configuration and includes two pairs of multi-tier racks 12. The left-side multi-tier rack 12L and the right-side multi-tier rack 12R, each has multi-tier (such as from five to 20 tiers) shelves 22 that extend in the same horizontal direction (arrow A direction and arrow B direction in FIGS. 1 to 4). A pair of multi-tier racks 12L, 12R are arranged in parallel facing each other with a predetermined space therebetween in a horizontal direction (hereinafter referred to as "left and right direction", which is indicated by arrows L and R in FIG. 3 or FIG. 4) orthogonal to the horizontal direction in which the shelves 22 extend.

Figure 3:
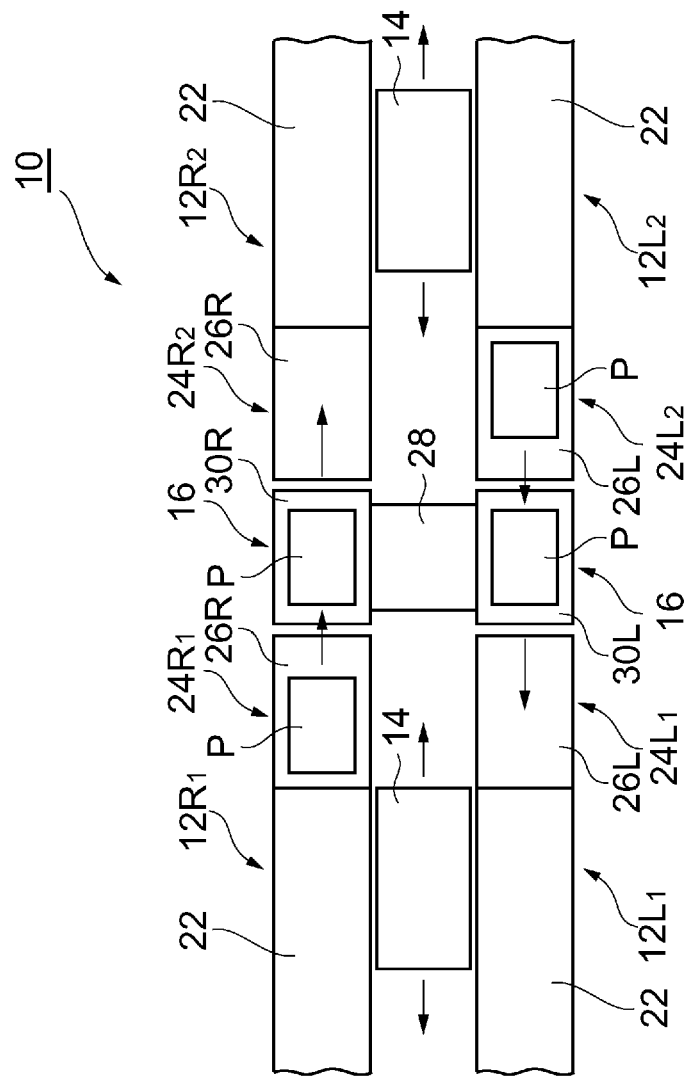
FIG. 3 is a schematic cross-section view taken on line III-III of FIG. 1.

Unlike conventional systems, one pair of multi-tier racks (first pair of multi-tier racks with suffix 1) $12L_1$, $12R_1$ are arranged in series with other pairs of multi-tier racks (second pair of multi-tier racks with suffix 2) $12L_2$, $12R_2$ along the horizontal direction in which the shelves 22 extend, that is, in the direction of arrows A and B in FIG. 3 or FIG. 4. One elevator 16 is disposed between the first pair of multi-tier racks $12L_1$, $12R_1$ and the second pair of multi-tier racks $12L_2$, $12R_2$.

A transferring shuttle 14 is provided at each tier between each pair of the left and right multi-tier racks 12L, 12R. Shuttle 14 can travel in the horizontal direction in which the shelves 22 extend. Transferring shuttle 14, which is not illustrated in detail, may be of the type disclosed in detail in United States Patent Application Publication No. 2011/0008138 A1, the disclosure of which is hereby incorporated herein by reference and will not be repeated. Suffice it to say, shuttle 14 includes: a traveling cart that can have a load P placed at the center portion thereof; a pair of arms that are disposed before and behind the traveling cart and are extensible to both sides in the horizontal direction (left and right direction) orthogonal to a traveling direction; and fingers which can be opened and closed are attached to the front end of each of the arms. By extending the arm with the fingers closed either leftward or rightward, a load P placed at the center portion of the traveling cart can be pushed out, enabling the load to be stored onto a shelf 22 at the same height level as the surface of the center portion of the traveling cart of the transferring shuttle. By extending the arm onto a shelf 22 with the fingers open, hooking a load P with the fingers of the front end of the arm closed and retracting the arm, the load P can be collected onto the traveling cart.

Waiting stations 24L, 24R are disclosed adjacent to ends, facing the elevator 16, of each pair of the left and right multi-tier racks 12L, 12R. Hereinafter, two waiting stations disposed adjacent to the first pair of multi-tier racks $12L_1$, $12R_1$ will be referred to as a first pair of waiting stations $24L_1$, $24R_1$, and two waiting stations disposed adjacent to the second pair of multi-tier racks $12L_2$, $12R_2$ will be referred to as a second pair of waiting stations $24L_2$, $24R_2$. The waiting stations 24L, 24R have the same number of waiting conveyors 26 as that of the number of tiers of shelves 22 of the adjacent multi-tier racks 12L, 12R, and each of the waiting conveyors 26 is disposed so that the conveying plane thereof has the same height level as that of its corresponding shelf 22 of the multi-tier racks 12L, 12R. The waiting conveyors 26 are oriented so that the conveying direction thereof is the same direction as the horizontal direction in which the shelves 22 extend. Various types of the waiting conveyors 26 may be used, but in the illustrated embodiment the waiting conveyors 26 are roller conveyors so as to be able to deliver a load P and receive a load P in a direction orthogonal to the conveying direction.

A first transferring shuttle 14 in the first pair of multi-tier racks $12L_1$, $12R_1$ can move up to the first pair of waiting stations $24L_1$, $24R_1$, and therefore, can deliver a load P to and receive a load P from the waiting conveyors 26 positioned at the same height level as that of the previously described transferring shuttle 14. Similarly, a transferring shuttle 14 in the second pair of multi-tier racks $12L_2$, $12R_2$ can move up to the second pair of waiting stations $24L_2$, $24R_2$.

Elevator 16 is disposed between the first pair of waiting stations $24L_1$, $24R_1$ and the second pair of waiting stations $24L_2$, $24R_2$. Elevator 16 in the illustrated embodiment is composed of a mast 28 disposed at the center of space between the first pair of waiting stations $24L_1$, $24R_1$ and the second pair of waiting stations $24L_2$, $24R_2$; and elevating platforms 30L, 30R that are disposed on the left and right sides of the mast 28 respectively and can move upward and downward.

Elevating platforms 30L, 30R, each has a belt conveyor, a roller conveyor, or the like, mounted thereon. A conveying direction thereof is switchable between an arrow A direction and arrow B direction illustrated in FIGS. 1 to 4. However, in the present embodiment, the right elevating platform 30R can transport in both directions A and B, whereas the conveying direction of the left elevating platform 30L may be only in the arrow A direction.

The conveying planes of the elevating platforms 30L, 30R can be aligned with a conveying plane of any of the waiting conveyors 26 from the highest tier to the lowest tier of the waiting stations 24L, 24R by moving the elevating platforms 30L, 30R upward or downward, enabling a load P to be delivered and received between the elevating platforms 30L, 30R and a desired waiting conveyor 26 at the waiting stations 24L, 24R.

Further, in the embodiment illustrated in FIGS. 1 to 4, below each pair of the multi-tier racks 12L, 12R and waiting stations 24L, 24R are disposed the storage conveyor 18 and retrieval conveyor 20 that are connected to an external conveying system (not illustrated). More specifically, as illustrated in FIG. 4, below the left multi-tier rack $12L_2$ of the second pair of multi-tier racks and the left waiting station $24L_2$ of the second pair of waiting stations is disposed a storage conveyor 18L that extends in parallel with the left multi-tier rack $12L_2$ and left waiting station $24L_2$. Below the right multi-tier rack $12R_2$ of the second pair of multi-tier racks and the right waiting station $24R_2$ of the second pair of waiting stations is disposed a storage conveyor 18R that extends in parallel with the right multi-tier rack $12R_2$ and right waiting station $24R_2$. Below the left multi-tier rack $12L_1$ of the first pair of multi-tier racks and the left waiting station $24L_1$ of the first pair of waiting stations is disposed a retrieval conveyor 20L that extends in parallel with the left multi-tier rack $12L_1$ and left waiting station $24L_1$. Further, below the right multi-tier rack $12R_1$ of the first pair of multi-tier racks and the right waiting station $24R_1$ of the first pair of waiting stations is disposed a retrieval conveyor 20R that extends in parallel with the right multi-tier rack $12R_1$ and right waiting station $24R_1$.

By lowering the elevating platform 30L on the left side of the elevator 16 to the lowest position, the conveying plane of the elevating platform 30L is aligned with the conveying plane of the left storage conveyor 18L and the conveying plane of the left retrieval conveyor 20L. Therefore, a load P from the storage conveyor 18L can be put onto the elevating platform 30L and the load P on the elevating platform 30L, as it is, can be pushed out to the retrieval conveyor 20L. The same applies to the elevating platform 30R on the right side of the elevator 16, and by lowering the elevating platform 30R to the lowest position, the conveying plane of the elevating platform 30R is aligned with the conveying plane of the right storage conveyor 18R and the conveying plane of the right retrieval conveyor 20R. Therefore, a load P can be moved from the storage conveyor 18R to the elevating platform 30R, and from the elevating platform 30R to the retrieval conveyor 20R.

In the automated storage/retrieval system 10 having such a configuration, various operation methods are considered, but a basic flow of a load P is as follows.

(1) Storage:

First, a load P conveyed from the storage conveyor 18 is transferred to its corresponding elevating platform 30.

Next, after elevating the elevating platform 30 to the level of a shelf 22 onto which the load P will be stored, the load P is transferred to an adjacent waiting conveyor 26. If the conveyor of the elevating platform 30 can be driven to both directions, the load P can be transferred onto both of two waiting conveyors 26 adjacent to the elevating platform. However, in the present embodiment, as illustrated in FIG. 3, a load P on the left elevating platform 30L can be transferred onto only the left waiting conveyor 26L of the first pair of waiting stations $24L_1$, $24R_1$, and a load P on the right elevating platform 30R can be transferred onto the right waiting conveyor 26R of the second pair of waiting stations $24L_2$, $24R_2$. That is simply for a higher efficiency, simplification, and the like, which will be more clearly understood below.

The load P transferred onto the waiting conveyor 26 is transferred by a transferring shuttle 14 to a accommodating position of a shelf 22 in the multi-tier rack 12 adjacent to the waiting conveyor 26, received and stored on the shelf 22. That is, a load P on the left elevating platform 30L will be stored in the first pair of multi-tier racks $12L_1$, $12R_1$ and a load P on the right elevating platform 30R will be stored in the second pair of multi-tier racks $12L_2$, $12R_2$.

(2) Retrieval:

In the present embodiment, in the case of retrieval, a load P stored in the first pair of multi-tier racks $12L_1$, $12R_1$ is first transferred by a transferring shuttle 14 onto the right waiting conveyor 26R on the first pair of waiting stations $24L_1$, $24R_1$ and it temporarily waits there. Meanwhile, a load P stored in the second pair of multi-tier racks $12L_2$, $12R_2$ is transferred onto the left waiting conveyor 26L on the second pair of waiting stations $24L_2$, $24R_2$.

Then, the load P on the waiting conveyors 26 is transferred onto the elevating platform 30 in alignment with the waiting conveyors 26. After that, the elevating platform 30 is lowered to the lowest position to push the load P onto the retrieval conveyor 20.

(3) Transfer of Load Between Waiting Conveyor and Elevating Platform:

As seen from FIG. 3, in the present embodiment, the left waiting conveyor 26L of the second pair of waiting stations $24L_2$, $24R_2$ and the conveyor of the left elevating platform 30L, and the left waiting conveyor 26L of the first pair of waiting stations $24L_1$, $24R_1$ can be aligned with one another, and their conveying directions are fixed to one direction, i.e., an arrow A direction. Therefore, where a load P to be stored is on the elevating platform 30L and a load P to be retrieved waits on the left waiting conveyor 26L of the second pair of waiting stations $24L_2$, $24R_2$, by simultaneously driving these conveyors, the load P to be stored can be transferred onto the waiting conveyor 26L and the load P to be retrieved can be transferred onto the elevating platform 30L simultaneously.

The right waiting conveyor 26R of the first pair of waiting stations $24L_1$, $24R_1$, the conveyor of the right elevating platform 30R, and the right waiting conveyor 26R of the second pair of waiting stations $24L_2$, $24R_2$ also can be aligned with one another and their conveying directions fixed to one direction, i.e., an arrow B direction. Therefore, like the above, where a load P to be stored is on the elevating platform 30R and a load P to be retrieved waits on the left waiting conveyor 26R of the first pair of waiting stations 24L$_1$, 24R$_1$, by simultaneously driving these conveyors, the load P to be stored can be transferred onto the waiting conveyor 26R and the load P to be retrieved can be transferred onto the elevating platform 30R simultaneously.

(4) Transfer of Load Between Storage/Retrieval Conveyor and Elevating Platform:

When the elevating platform 30 is at the lowest position, the elevating platform 30 is in alignment with the storage conveyor 18 and retrieval conveyor 20. Accordingly, where a load P to be retrieved is on the elevating platform 30 and a load P to be stored is on the storage conveyor 18, by simultaneously driving the conveyor of the elevating platform 30, storage conveyor 18 and retrieval conveyor 20 in an arrow A direction, transfer of the load P to be retrieved onto the retrieval conveyor 20 and transfer of the load P to be stored onto the elevating platform 30 can be simultaneously performed.

There are cases where a load P conveyed by the storage conveyor 18 must be immediately transferred onto the retrieval conveyor 20 without being stored in the multi-tier rack 12. In these cases, a load P can move from the storage conveyor 18 through the elevating platform 30 to the retrieval conveyor 20.

As described in sections (3) and (4) above, in the present embodiment, with one elevating platform 30, storage and retrieval can be simultaneously performed. In addition, a load P on the elevating platform 30 is pushed out and at the same time another load P is placed onto the same elevating platform 30, which reduces vertical movement of the elevating platform 30 without a load. Therefore, with only one elevator 16, a load P can be stored and retrieved efficiently, which realizes throughput performance matching that of a conventional configuration in which two pairs of multi-tier racks and two elevators are arranged in parallel.

In addition, since only one elevator 16 is needed for two pairs of multi-tier racks 12, although a storage capacity is the same as that of the conventional configuration, the automated storage/retrieval system 10 itself is simplified, reducing a facility cost and installation space from those of the conventional configuration. The present embodiment can be applied to a building with a height limit. Further, since a fixed flow of a load P simplifies the layout and allows for retrieval in strict order, which in turn contributes to improvement of throughput performance of the system.

In addition, the storage conveyor 18 and retrieval conveyor 20 are disposed below the multi-tier rack 12 and waiting station 24, which also reduces space.

The preferred embodiment of the present invention has been described in detail, but it should be appreciated that the present invention is not limited to the above embodiment.

Figure 5A:
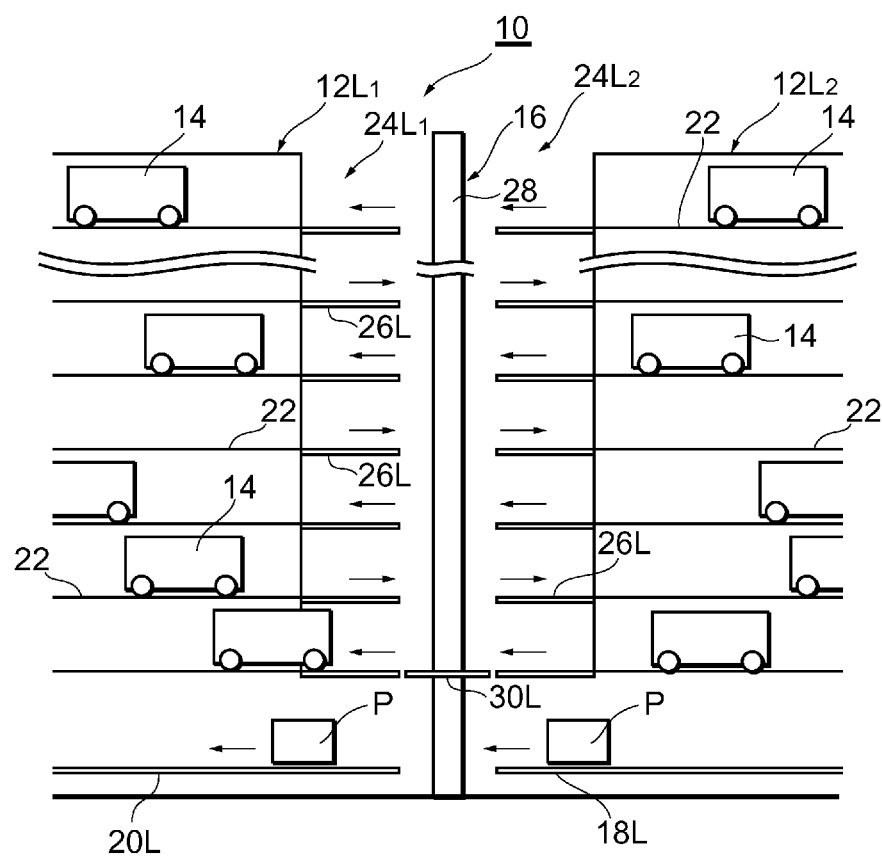
FIGS. 5A and 5B are schematic side views illustrating an automated storage/retrieval system according to another embodiment of the present invention.
Figure 5B:
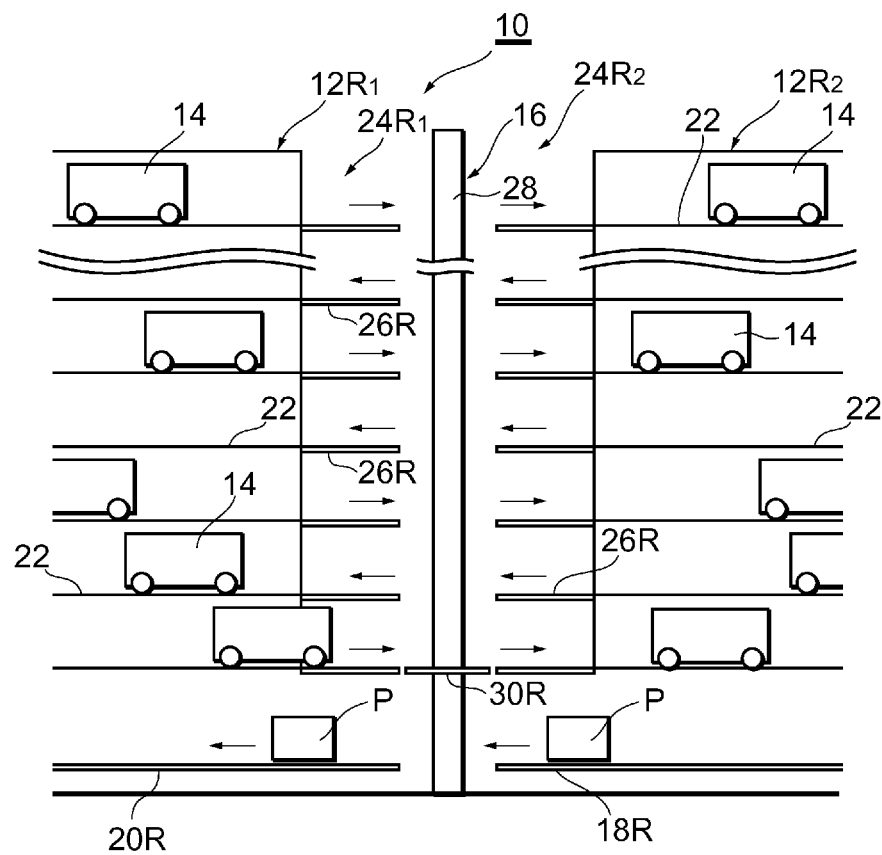

For example, various ways to flow a load P are considered. As illustrated in FIG. 5, a flow direction may be changed alternately every tier. As seen from FIGS. 5A and 5B, a flow direction of a load P at the right side may be opposite to a flow direction of a load P at the left side.

Figure 6:
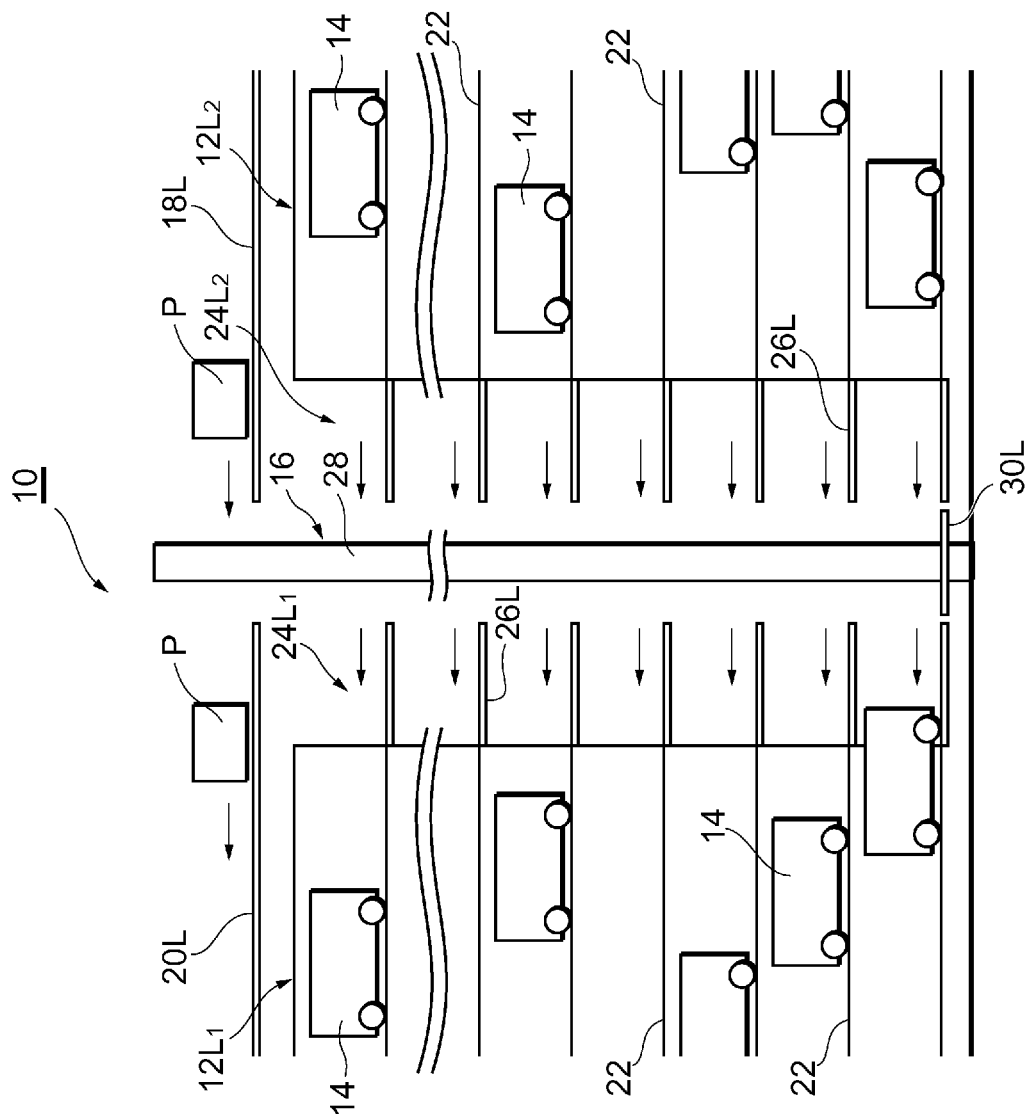
FIG. 6 is a schematic side view similar to that of FIG. 1, illustrating a variation of an automated storage/retrieval system of the present invention.
Figure 7:
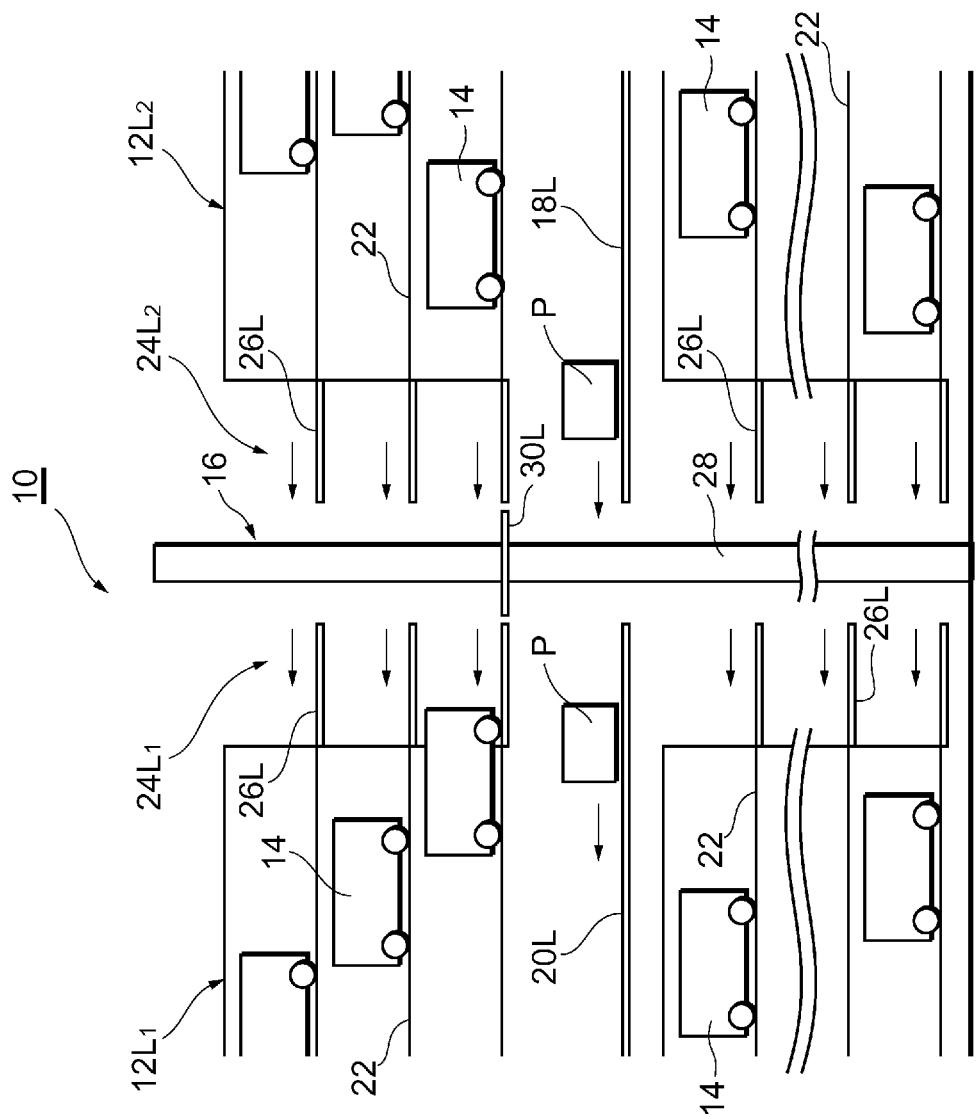
FIG. 7 is a schematic side view similar to that of FIG. 1, illustrating another variation of an automated storage/retrieval system of the present invention.

In the above embodiment, the storage conveyor 18 and retrieval conveyor 20 are disposed at the lowest position, but they may be disposed at the highest position as illustrated in FIG. 6, or at the intermediate position as illustrated in FIG. 7. Further, although not illustrated, at the left side the storage conveyor 18 and retrieval conveyor 20 may be disposed at the lowest position as illustrated in FIG. 1; and at the right side the storage conveyor 18 and retrieval conveyor 20 may be disposed at the highest position as illustrated in FIG. 6. A way to flow a load P in the configurations illustrated in FIGS. 6 and 7 is the same as that of in the configurations illustrated in FIGS. 1 to 4.

Figure 8:
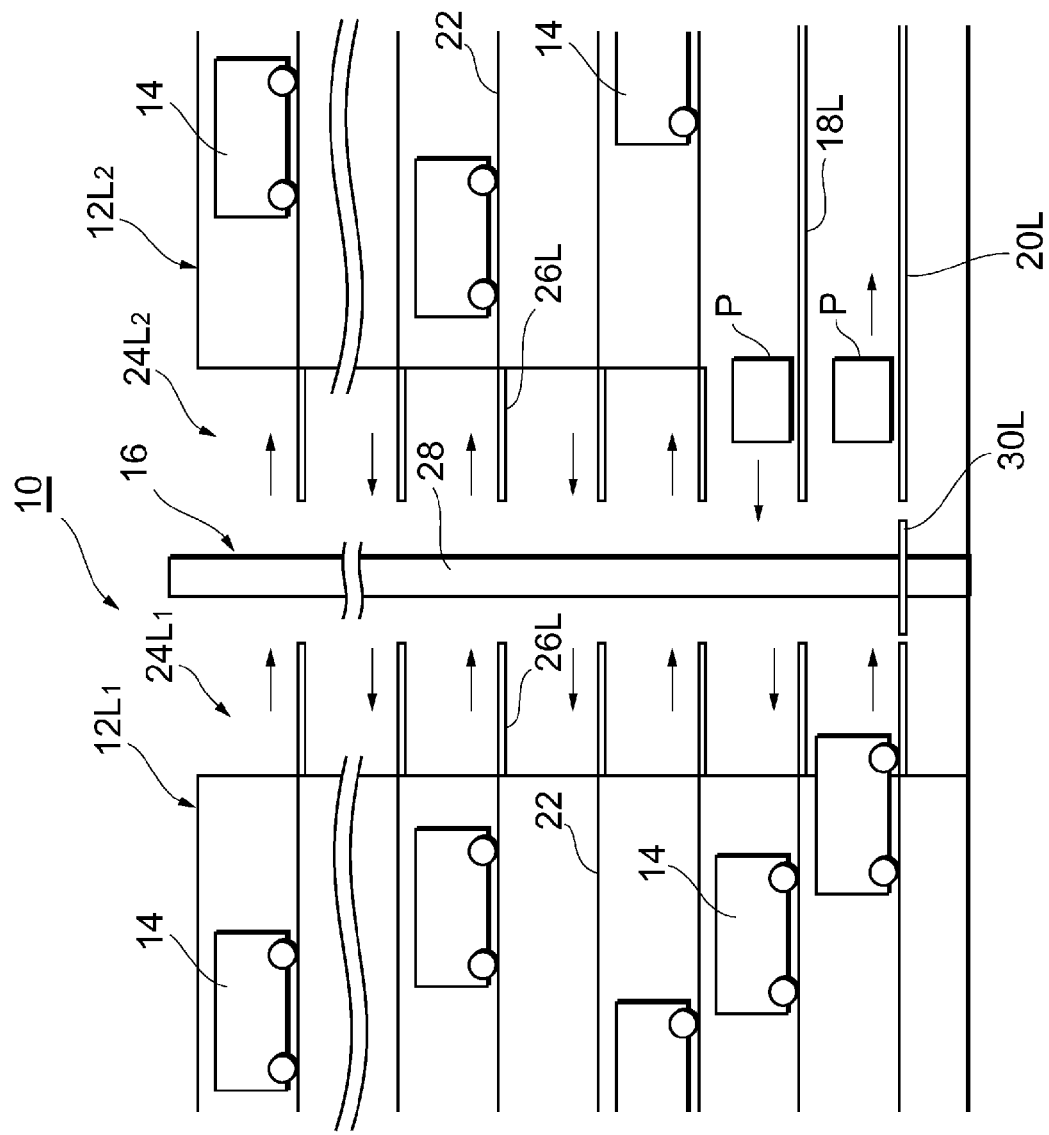
FIG. 8 is a schematic side view similar to that of FIG. 1, illustrating yet another variation of an automated storage/retrieval system of the present invention.
Figure 9:
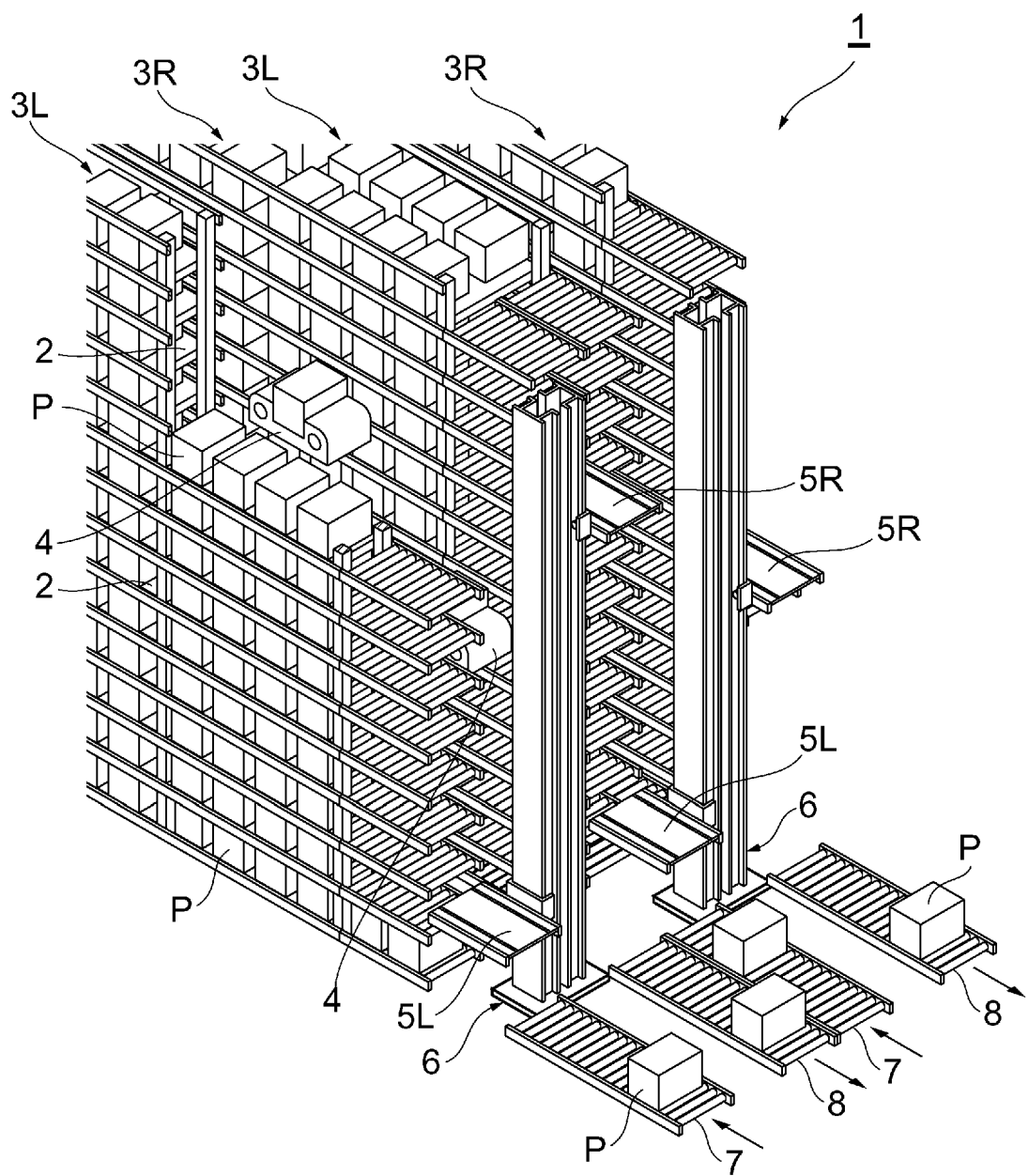
FIG. 9 is a perspective view illustrating a conventional automated storage/retrieval system.

As illustrated in FIG. 8, at each of the left and right sides, the storage conveyor 18 and retrieval conveyor 20 may be arranged one above the other. In the configuration illustrated in FIG. 8, a way to flow a load P is the same as that of FIG. 5, but may be the same as that of FIGS. 1 to 4.

Still further, even if only one storage conveyor 18 and only one retrieval conveyor 20 can be installed, it is possible that the storage conveyor 18 can be connected to the left elevating platform 30L and the retrieval conveyor 20 can be connected to the right elevating platform 30R (not illustrated).

The above embodiments employ a basic unit of two multi-tier racks. Accordingly, a configuration in which such basic units are arranged in parallel shall be included in the scope of the present invention.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

What is claimed is:

1. An automated storage/retrieval system, comprising:
   a first pair of multi-tier racks, each having shelves that are arranged in parallel to face each other;
   a first pair of waiting stations, each being disposed adjacent to one end of each of the first pair of multi-tier racks, the first pair of waiting stations having the same tier number of waiting conveyors as the number of the shelves;
   a first transferring shuttle that is provided for at least one tier of the shelves and waiting conveyors so as to be able to travel horizontally between the first pair of multi-tier racks and between the first pair of waiting stations, the first transferring shuttle for delivering a load (P) to and receiving a load (P) from the shelves and the waiting conveyors;
   a second pair of multi-tier racks, each having shelves that are arranged in parallel to face each other, the second pair of multi-tier racks being generally aligned in series with the first pair of multi-tier racks so that the first pair of waiting stations are disposed between the second pair of multi-tier racks and the first pair of multi-tier racks;
   a second pair of waiting stations, each being disposed adjacent to one end of each of the second pair of multi-tier racks so as to face each of the first pair of waiting stations, the second pair of waiting stations having the same tier number of waiting conveyor as the number of the shelves of the second pair of multi-tier racks;
   a second transferring shuttle that is provided for at least one tier of the shelves of the second pair of multi-tier racks and the waiting conveyors of the second pair of waiting stations so as to be able to horizontally travel between the second pair of multi-tier racks and between the second pair of waiting stations, the second transferring shuttle for delivering a load (P) to and receiving a load (P) from the shelves of the second pair of multi-tier racks and the waiting conveyors of the second pair of waiting stations;

an elevator disposed between the first pair of waiting stations and the second pair of waiting stations, the elevator comprising first and second elevating platforms, each adapted to deliver a load (P) to a waiting conveyor at one of the first and second pairs of waiting stations and receive a load (P) from a waiting conveyor at the other of the first and second pairs of waiting stations;

a first conveyor for delivering a load (P) to and receives a load (P) from the first elevating platform; and a second conveyor for delivering a load (P) to and receives a load (P) from the second elevating platform.

2. The automated storage/retrieval system according to claim 1, wherein the first elevating platform, second elevating platform and waiting conveyors form a continuous conveying plane when the first and second elevating platforms are in alignment with waiting conveyors at each tier of the first pair of waiting stations and are in alignment with the waiting conveyors at its corresponding tier of the second pair of waiting stations.

3. The automated storage/retrieval system according to claim 1, wherein one waiting station of the first pair of waiting stations is for storage and one waiting station of the second pair of waiting stations that is at the same side of the waiting station is for retrieval; and wherein the other waiting station of the first pair of waiting stations is for retrieval and the other waiting station of the second pair of waiting stations that is at the same side of the waiting station is for storage.

4. The automated storage/retrieval system according to claim 1, further comprising:

a third conveyor for delivering a load (P) to and receives a load (P) from the first elevating platform; and a fourth conveyor for delivering a load (P) to and receives a load (P) from the second elevating platform, wherein the first conveyor and the second conveyor are for storage and the third conveyor and the fourth conveyor are for retrieval, when the first elevating platform is at a predetermined height, the first conveyor, the first elevating platform and the third conveyor form a continuous conveying plane; and when the second elevating platform is at a predetermined height, the second conveyor, the second elevating platform and the fourth conveyor form a continuous conveying plane.

5. An automated storage/retrieval system, comprising:

two pairs of multi-tier racks with shelves, each pair of multi-tier racks comprised of two racks that are parallel and facing each other and extending along a direction, said two pairs of multi-tier racks generally aligned in series along said direction in which the shelves extend, an elevator disposed between the two pairs of multi-tier racks, a transferring shuttle provided for at least one tier of said shelves so as to be able to travel horizontally between said elevator and said shelves for transferring a load (P) between the shelves and said elevator, said elevator adapted to concurrently deliver a load (P) to the two pairs of multi-tier racks from a delivering conveyor for storage of the load (P) and receive a load (P) from the two pairs of multi-tier racks through the elevator to a receiving conveyor for retrieval of the load (P).

6. The automated storage/retrieval system according to claim 5 including a first pair of waiting stations, each being disposed adjacent to one of each of said first pair of multi-tier racks and a second pair of waiting stations, each being adjacent to one end of said second pair of multi-tier racks, wherein said elevator is disposed between said first pair of waiting stations and said second pair of waiting stations.

7. The automated storage/retrieval system according to claim 6, wherein said elevator comprises a first elevating platform that is adapted to deliver a load (P) to and receive a load (P) from one of said first pair of waiting stations and a second elevating platform that is adapted to deliver a load (P) to and receiving a load (P) from one of said second pair of waiting stations.

8. The automated storage/retrieval system according to claim 7 further including a first conveyor that is adapted to deliver a load (P) to and receive a load (P) from said first elevating platform and a second conveyor that is adapted to deliver a load (P) to and receive a load (P) from said second elevating platform.

9. The automated storage/retrieval system according to claim 8, wherein one waiting station of the first pair of waiting stations is for storage and one waiting station of the second pair of waiting stations that is at the same side of the waiting station is for retrieval; and wherein the other waiting station of the first pair of waiting stations is for retrieval and the other waiting station of the second pair of waiting stations that is at the same side of the waiting station is for storage.

10. The automated storage/retrieval system according to claim 9, further comprising:

a third conveyor for delivering a load (P) to and receives a load (P) from the first elevating platform; and a fourth conveyor for delivering a load (P) to and receives a load (P) from the second elevating platform, wherein the first conveyor and the second conveyor are for storage and the third conveyor and the fourth conveyor are for retrieval, when the first elevating platform is at a predetermined height, the first conveyor, the first elevating platform and the third conveyor form a continuous conveying plane; and when the second elevating platform is at a predetermined height, the second conveyor, the second elevating platform and the fourth conveyor form a continuous conveying plane.

11. The automated storage/retrieval system according to claim 2, wherein one waiting station of the first pair of waiting stations is for storage and one waiting station of the second pair of waiting stations that is at the same side of the waiting station is for retrieval; and wherein the other waiting station of the first pair of waiting stations is for retrieval and the other waiting station of the second pair of waiting stations that is at the same side of the waiting station is for storage.

12. The automated storage/retrieval system according to claim 11, further comprising:

a third conveyor for delivering a load (P) to and receives a load (P) from the first elevating platform; and a fourth conveyor for delivering a load (P) to and receives a load (P) from the second elevating platform, wherein the first conveyor and the second conveyor are for storage and the third conveyor and the fourth conveyor are for retrieval, when the first elevating platform is at a predetermined height, the first conveyor, the first elevating platform and the third conveyor form a continuous conveying plane; and when the second elevating platform is at a predetermined height, the second conveyor, the second elevating platform and the fourth conveyor form a continuous conveying plane.

13. The automated storage/retrieval system according to claim 2, further comprising:
- a third conveyor for delivering a load (P) to and receives a load (P) from the first elevating platform; and
- a fourth conveyor for delivering a load (P) to and receives a load (P) from the second elevating platform, wherein
- the first conveyor and the second conveyor are for storage and the third conveyor and the fourth conveyor are for retrieval,
- when the first elevating platform is at a predetermined height, the first conveyor, the first elevating platform and the third conveyor form a continuous conveying plane; and
- when the second elevating platform is at a predetermined height, the second conveyor, the second elevating platform and the fourth conveyor form a continuous conveying plane.

14. The automated storage/retrieval system according to claim 3, further comprising:
- a third conveyor for delivering a load (P) to and receives a load (P) from the first elevating platform; and
- a fourth conveyor for delivering a load (P) to and receives a load (P) from the second elevating platform, wherein
- the first conveyor and the second conveyor are for storage and the third conveyor and the fourth conveyor are for retrieval,
- when the first elevating platform is at a predetermined height, the first conveyor, the first elevating platform and the third conveyor form a continuous conveying plane; and
- when the second elevating platform is at a predetermined height, the second conveyor, the second elevating platform and the fourth conveyor form a continuous conveying plane.

* * * * *